United States Patent [19]

Samimi

[11] Patent Number: 6,090,425
[45] Date of Patent: *Jul. 18, 2000

[54] EGG PROCESSING SYSTEM AND METHOD OF USING SAME TO EXTEND THE REFRIGERATED SHELF LIFE OF LIQUID EGG PRODUCT

[76] Inventor: Mohammad H. Samimi, 2934 Hilltop Mall Rd., Suite 110, Richmond, Calif. 94806

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/805,060

[22] Filed: Feb. 24, 1997

Related U.S. Application Data

[60] Continuation-in-part of application No. 08/648,582, May 16, 1996, which is a division of application No. 08/379,016, Jan. 27, 1995, abandoned.

[51] Int. Cl.[7] .............................. B65B 55/00; A23B 5/00; A23L 1/32
[52] U.S. Cl. ...................... 426/399; 426/614; 426/330.1; 426/521
[58] Field of Search .................................. 426/614, 392, 426/407, 330.1, 521, 327

[56] References Cited

U.S. PATENT DOCUMENTS

| | | | |
|---|---|---|---|
| 2,565,311 | 8/1951 | Koonz et al. | 426/521 |
| 2,936,240 | 5/1960 | Kauffman . | |
| 3,232,769 | 2/1966 | Miller . | |
| 3,404,008 | 10/1968 | Ballas et al. | 426/521 |
| 3,579,631 | 5/1971 | Stewart et al. | 424/86 |
| 3,658,558 | 4/1972 | Rogers et al. | 426/614 |
| 3,843,813 | 10/1974 | Driggs | 426/521 X |
| 4,511,589 | 4/1985 | Padly et al. | 426/521 |
| 4,742,667 | 5/1988 | Müller et al. | 426/407 |
| 4,957,760 | 9/1990 | Swartzel et al. | 426/614 |
| 4,994,291 | 2/1991 | Swartzel et al. | 426/521 X |
| 5,028,448 | 7/1991 | Ros | 426/614 |
| 5,167,976 | 12/1992 | Papetti | 426/614 X |
| 5,283,033 | 2/1994 | Dodrill | 476/407 |
| 5,290,583 | 3/1994 | Reznik et al. | 426/614 |

FOREIGN PATENT DOCUMENTS 2278992  12/1994  United Kingdom .

OTHER PUBLICATIONS

H.R. Ball, Jr., et al., "Functionality and Microbial Stability of Ultrapasteurized Aseptically Packaged Refrigerated Whole Egg," *J. Food Science* 52: 1212–1218, 1987.

O.J. Cotterill et al., "Hot–Pack Pasteurization of Salted Egg Products," *Poultry Science* 53: 636–645, 1974.

P.M. Foegeding, et al. "Growth and Inactivation of Microorganisms Isolated from Ultra–pasteurized Egg," *J. Food Science* 52:1219–1227, 1987.

W.J. Stadelman et al., *Egg Science and Technology*, 2nd ed., 1977, pp. 175–180.

*Primary Examiner*—Anthony J. Weier
*Attorney, Agent, or Firm*—Rankin, Hill, Porter, & Clark LLP

[57] ABSTRACT

A process for producing pasteurized liquid egg product utilizing a vat or tank for holding raw egg product. The raw egg product is preheated as rapidly as possible to a temperature of about 140° F. and then, without holding the temperature at a constant level, the preheated raw egg is transferred to a suitable package. The package containing the preheated raw egg product is then sealed and heated and maintained at a suitable temperature in order to pasteurize the liquid raw egg products in the packages. The heated containers and pasteurized liquid egg product are then cooled rapidly to a refrigeration temperature to further inhibit germination of any remaining bacterial spores. The containers are then stored in refrigeration conditions for distribution and use. In another embodiment, an egg product package is preheated to a temperature between 71.1° C. and 55° C. and then hot filled with a egg product treated to about the same temperatures as the package. The hot filled package is then sealed and allowed to stand for about 30 seconds and then it is rapidly cooled to at least about 5° C. in a cooling time period of about 5 mintues.

33 Claims, 1 Drawing Sheet

EGG PROCESSING SYSTEM AND METHOD OF USING SAME TO EXTEND THE REFRIGERATED SHELF LIFE OF LIQUID EGG PRODUCT

RELATED APPLICATIONS

This is a continuation-in-part application of U.S. patent application Ser. No. 08/648,582, filed May 16, 1996, which is a divisional of U.S. patent application Ser. No. 08/379,016 filed Jan. 27, 1995, now abandoned.

TECHNICAL FIELD

The present invention relates in general to an improved method and apparatus for processing liquid egg and liquid egg products. More particularly, the invention relates to an improved pasteurization process and processing system for extending the refrigerated shelf life of pasteurized liquid egg and liquid egg products.

BACKGROUND OF THE INVENTION

Pasteurized liquid whole egg products have been used for many years to replace shell eggs. Liquid whole egg products have generally been considered to be more convenient for use, especially on a large scale. Commercial egg products must be subjected to pasteurization processes to produce a pathogen-free food.

Pasteurization of egg products have been mandated by regulations in the United States and other countries so that the egg product is free of pathogenic bacteria. In the United States pasteurization is generally conducted at 140 degrees Fahrenheit (60° C.) for a period of at least 3.5 minutes. The objective of pasteurization of an egg product is to produce a salmonellae-negative product, although the number of other microorganisms is also reduced by this process.

Reference is made to an article by P. M. Foegeding and N. W. Stanley, "Growth and Inactivation of Microorganisms Isolated From Ultrapasteurized Egg," Journal of Food Science, Vol. 52, No. 5, 1987, pp. 1219–1227, which indicates that there are several types of microorganisms found in raw egg products. For example, Pseudomonas sp, enterococcus sp, *B circulans,* and *B. cereus* isolate, are among such microorganisms which may be isolated from raw liquid whole egg.

There have also been many types and kinds of apparatuses and processes for pasteurizing food products. For example reference may be made to the following foreign patent U.K. Patent No. 2,278,992A and U.S. Pat. Nos.: 2,565,311; 2,936, 240; 3,232,769; 3,404,008; 3,579,631; 3,615,659; 3,738, 847; 3,843,825; 4,490,401; 4,511,589; 4,627,984; 4,946, 041; 5,019,408; 5,048,404; and article by H. R. Ball, Jr. et al., "Functionality and Microbial Stability of Ultrapasteurized, Aseptically Packaged Refrigerated Whole Egg," Journal of Food Science, Vol. 52, No. 5, 1987, P. 1212–1218.

Pasteurized liquid whole egg products with long shelf-life have been produced in the United States according to the teachings of several patents by Swartzel et al. and others as indicated above. The article by H. R. Ball, Jr. et al., describes a pasteurization process for liquid whole eggs where pasteurized product is subsequently aseptically packaged. Long shelf-life liquid pasteurized eggs are more convenient and have a better quality than frozen or dried egg products.

While such a process pasteurizes the egg, the aseptic packaging technique is restrictive in that only certain size and type of packages may be employed with apparatuses designed to achieve this task.

Therefore, it would be highly desirable to have a new and improved technique for pasteurizing raw liquid egg and egg products that do not require aseptic packaging. Such a new and improved process should also permit the pasteurized liquid egg and liquid egg product to be packaged in different types and kinds of packaging, including packaging of different sizes and volumes.

Therefore, it would be highly desirable to have a new and improved technique for pasteurizing raw liquid egg and liquid egg products that do not require aseptic packaging. Such a new and improved process should also permit the pasteurized liquid egg and liquid egg products to be packaged in different types and kinds of packaging, include packaging of different sizes and volumes.

U.S. Pat. Nos. 2,565,311 and 2,936,240 describe prior art whole egg pasteurization processes in which the steps of heating, chilling, and packaging occur in that order.

U.S. Pat. No. 3,232,769 shows a method of preparing eggs and food products in which the whites and yolks of eggs are separated, cooked, and then mixed with salad ingredients and lactic acid to adjust the pH of the mixture. Packaging and sealing occur followed by heating to a temperature of 170 degrees Fahrenheit to destroy harmful agents. This process essentially cooks the product, therefore it cannot be used to substitute liquid whole eggs.

U.S. Pat. Nos. 3,404,008; 3,579,631; and 4,511,589 teach processes pasteurizing egg products which employ heat exchangers. Pasteurized egg products are packaged following the use of the apparatuses shown in these references. It has been found that heat exchangers tend to foul during such processes, although successful in pasteurizing the raw egg product.

U.S. Pat. No. 5,167,976 teaches a method of extending the shelf life of liquid egg product by employing a two step heating process followed by cooling and packaging.

U.S. Pat. Nos. 3,843,813 and 5,290,583 show radio frequency and electroheating techniques applied to pasteurization of liquid egg products.

U.S. Pat. No. 4,994,291 reveals a method of ultrapasteurizing liquid whole egg product employing time and temperature parameters. In this reference, liquid whole egg product is subjected to heat treatment described by an equivalent temperature method followed by aseptically packaging the liquid whole egg product. Applicant incorporates by reference U.S. Pat. No. 4,994,291 in its entirety in the present application.

Perhaps the most promising method and apparatus is disclosed in Great Britain patent GB 2,278,992. The GB patent discloses a method and apparatus where unpasteurized or pasteurized liquid egg is placed in a non-aseptic container that is then sealed and heated to a pasteurization temperature of between about 140 degrees Fahrenheit and 155 degrees Fahrenheit and maintained for a predetermined period of time between about three minutes and about 30 minutes depending upon the initial pasteurization state of the liquid egg product.

While such a technique may help extend the shelf life of raw egg and raw liquid egg products, application of the technique is relatively expensive, and does not help throughput. In this regard, the cold fill system as disclosed in the Great Britain patent 2,278,992 requires a long come-up time for the production throughput when the product and package are heated by conventional means. Moreover, while the application of other heating techniques such as radio frequency, microwave or heating by applying electricity may help increase throughput, such heating techniques are generally more expensive and require special types and kinds of heating equipment.

For example, a one liter package of eggs at 40 degrees Fahrenheit requires about 30 to 45 minutes of heating time to reach a temperature of between about 145 degrees Fahrenheit and about 155 degrees Fahrenheit. Thus, such a heating time requires a very lengthy heating tunnel, if the process is carried out on a commercial basis. Such a long heating tunnel not only significantly increases processing time, but also requires a significant "come-up" time to reach a desired pasteurization temperature such a slow come-up time also may well damage the quality of the egg and may well not permit the egg product to be heated to a pasteurization temperature above 155 degrees Fahrenheit. Also, if larger packages are utilized in a long tunnel, throughput time is further decreased due to the larger volumes of product to be pasteurized.

Therefore, it would be highly desirable to have a new and improved processing technique for extending the shelf life of a liquid egg and liquid egg products. Such a new and improved processing technique should significantly increase throughput and thus, help reduce the costs for processing such liquid egg products.

A method for processing liquid egg products which overcomes the disadvantages found in the prior art methods and apparatuses would be a notable advance in the food processing field.

DISCLOSURE OF INVENTION

Therefore the principle object of the present invention is to provide a hot fill process for producing pasteurized liquid egg products which significantly extends the refrigerated shelf life of the product.

Another object of the present invention is to provide a hot fill process for producing pasteurized liquid egg products which overcomes the complexities of slow come up time which may limit the pasteurization processing temperatures employed to extend product shelf life.

A further object of the present invention is to provide a process for producing pasteurized liquid egg products which makes possible the use of packages having a variety of sizes, shapes, and materials not possible with the prior art methods of pasteurization of liquid egg products.

Another object of the present invention is to provide a process for producing pasteurized liquid egg products which obviates the possibility of post pasteurization contamination found in the prior art methods.

Yet another object of the present invention is to provide a process for producing pasteurized liquid egg product which eliminates expensive equipment needed to pasteurize liquid egg products in the prior art methods.

Another object of the present invention is to provide a process for producing pasteurized liquid egg product which is less expensive than methods practiced in the prior art.

Briefly, the above and further objects of the present invention are realized by providing novel and useful process for producing pasteurized liquid egg and liquid egg products which have an extended shelf life at refrigerated temperatures.

The process of the present invention anticipates the providing of liquid raw egg product in a tank or vat which is obtained in the conventional manner, i.e., by obtaining whole eggs, breaking the shells of the whole eggs to obtain the liquid product therewithin, and discarding the shells. The liquid raw egg product is then agitated and heated rapidly to a preheated packaging temperature of about 131 degrees Fahrenheit to about 160 degrees Fahrenheit, without holding the product at a constant temperature. When the liquid egg or liquid egg product reaches the preheated packaging temperature, the product is transferred immediately into a non-aseptic container that is immediately sealed in an air tight manner. The product is then held at the final constant fill temperature for a holding period not to exceed hold periods as indicated by Equations 1 & 2 or Tables III and IV.

In another embodiment of the invention, the product may be heated to a lower pasteurization temperature e.g. 140 degrees Fahrenheit, packaged in a non-aseptic container, sealed and further heated to a higher pasteurization temperature of say 145 degrees Fahrenheit, and then cooled. The heating time after the product is filled in the package must be less than the corresponding hold time for the fill temperature as indicated in Tables III and IV herein. The product may then be held at the final constant temperature for the corresponding hold time at that temperature.

In another embodiment of the invention, once the preheated liquid egg or liquid egg product is sealed in the non-aseptic container, the temperature of the product need not be further increased. In this embodiment, the product heating time in the package is zero, as the containerized product is allowed to cool slowly from 160 degrees Fahrenheit to about 140 degrees Fahrenheit anywhere between 30 minutes to 2 minutes. Heating may take place through different methods, such as microwave, radio frequency (RF), ohmic heating, or through heat exchangers, or any suitable heating technique.

Although heating the product to the pasteurization temperature is achieved in a relatively short period of time of between about 3.5 minutes and about 10 minutes, even shorter periods of heating may be achieved. In this regard, heating may take place through different methods such as microwave, radio frequency (RF), or ohmic heating, through heat exchangers, or any other suitable heating technique. Such other techniques may reduce the heating time period from about 10 minutes to about 4 minutes, and from about 3.5 minutes to 30 seconds.

Following pasteurization, the containerized product is rapidly cooled at a rate sufficient to refrigerate the egg product in the container in order to inhibit germination of bacterial spores therein. Agitation may be applied to the containers during the cooling of the prior heating steps in order to release or distribute heat evenly throughout the package and product. Such vibrational movement may be applied mechanically or through sonic methods. Moreover, the packaged egg product may then be shipped or stored while refrigerated. It has been found that the process of the present invention produces a liquid egg product with an extended shelf life without the restraints of non-aseptic packaging. Moreover, production throughput is significantly increased.

BRIEF DESCRIPTION OF THE DRAWINGS

The above-mentioned and other objects and features of this invention and the manner of obtaining this will become apparent and the invention itself will be best understood by reference to the following description of an embodiment of the invention taken in conjunction with the accompanying drawings, wherein.

DETAILED DESCRIPTION OF THE PREFERRED EMBODIMENTS

Figure 1:
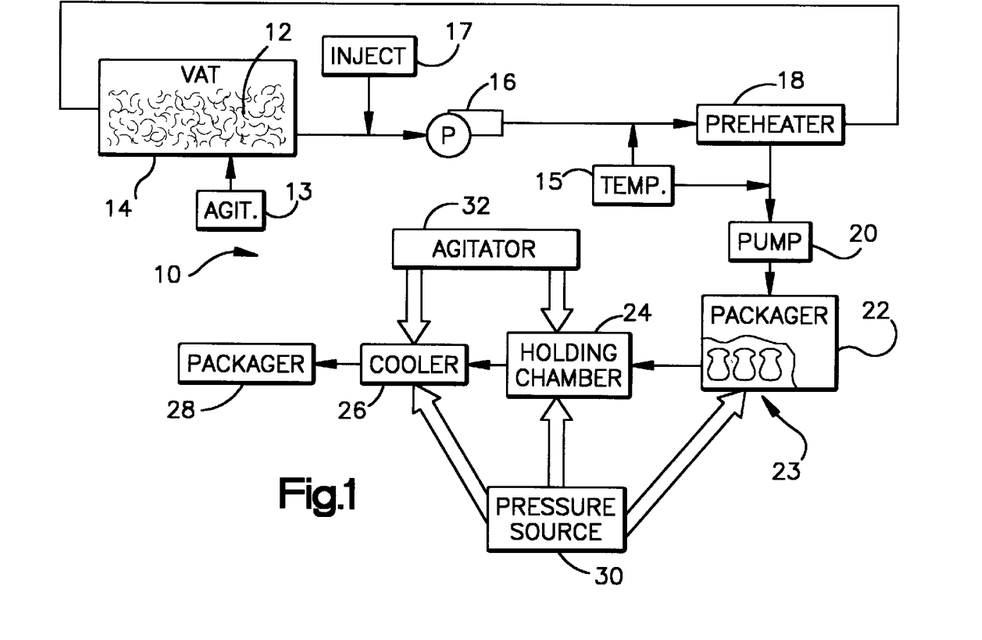
FIG. 1 is a block diagram showing a method of the present invention.

Referring now to the drawings, and more particularly to FIG. 1 thereof, there is shown schematically a hot fill process 10 for extending the shelf life of liquid egg and liquid egg products in accordance with the novel method of the present invention. The process 10 involves the provision of an egg product 12 which may be placed in a vat or tank 14 equipped with a mixer or agitator 13 for homogenizing the liquid egg or liquid egg product.

The product 12 may take the form of raw eggs, egg mixes, egg substitute, or liquid egg products which may be a combination of the above with or without the addition of color additives, particulates, dairy products, such as milk or cheese, color preservatives, such as citric acid, meat or vegetable products such as bacon bits, or any chemical additives, such as salt or salt-substitute. The vat 14 further serves as a source for a non-aseptic pump 16 which transfers raw liquid egg product 12 to a non-aseptic preheater 18.

A chemical injector 17 is employed at this preheating stage of the process to add bacteria destroying entities, such as hydrogen peroxide, in accordance with prior art methods. The raw homogenized liquid egg product 12 passing into preheater 18 is subject to heat which raises the temperature of the product 12 to a pasteurization temperature which is sufficient to commence killing the microorganisms contained with the vat 14 and the liquid egg product 12.

As will be explained in greater detail, the temperature of the product 12 is not held or maintained for a sufficient period of time to effect complete pasteurization. Instead, once the liquid egg or liquid egg product reaches a pasteurization temperature of about 135 degrees Fahrenheit, as sensed by a temperature sensor 15, the contents of the vat 14 are evacuated into non-aseptic packages via another non-aseptic pump 20. In certain cases, a chemical entity such as hydrogen peroxide may be added to raw liquid egg product 12. Such addition tends to reduce the necessary temperature of pasteurization and tends to obviate coagulation of product 12. In other words, the raw egg product 12, without additional of chemical entity, may be raised to approximately 60° C. by direct or indirect heating, radio waves, microwaves, ohmic heating, and/or other suitable methods by the preheater 18.

Heating may be accomplished without coagulating the liquid egg product 12. The pump 20 transfers the heated liquid egg product from preheater 18 to a non-aseptic packager 22 where specific amounts of heated liquid egg product are placed in a plurality 23 of non-aseptic containers 23. Such containers 23 may take the form of plastic bottles, metal cans, plastic bags, glass jars, or any other type of packages which have air-tight integrity. In should also be noted that such packages are not possible with the cost and/or technical restrictions of aseptic packaging systems used in the prior art.

Once filled, the containers 23 are sealed in an air-tight manner and then discharged from the non-aseptic packager 22 and passed to a holding chamber 24 which maintains the pasteurization temperature by the circulation of air or liquid for a predetermined period of time that is sufficient to complete the pasteurization process. Since the product in the containers 23 was preheated to a non-holding pasteurization temperature, the time period to complete the pasteurization process is between about a half of a minute and about thirty five minutes. A more preferred time in between about three minutes and about ten minutes. The effect then, of preheating the product 12 helps to significantly increase throughput, which in turn helps reduce the cost of production.

Moreover, by preheating the liquid egg product, pasteurization temperatures of between about 131 degrees Fahrenheit and 160 degrees Fahrenheit can be achieved without product coagulation. Such a higher temperature is preferred for better bacteria kill and for helping to significantly increase shelf life of the product from a lower shelf life limits of about three weeks to a higher shelf life limit of about 36 weeks.

It will be understood by those skilled in the art that the preheated product 12 also initiates pasteurization of the non-aseptic containers 23, allowing the containers 23 to remain at a sufficiently high pasteurization temperature to pasteurize the container 23, which in turn helps to significantly increase the extended shelf life of the product 12.

Following the pasteurization holding period, the containers 23 are transferred from the chamber 24 to a cooler 26 where such containers 23 are rapidly cooled to refrigeration levels that are sufficiently cool for helping to preserve the liquid egg product, but not sufficiently cool to freeze the liquid egg product. A preferred period for cooling is between about 10 minutes and about 120 minutes. A more preferred period for cooling is between about 30 minutes and about 60 minutes and the most preferred period of time is about 45 minutes.

The containers 23 exit the cooler 26 are then sent to packager 28 which essentially combines containers 23 from packager 22 into larger containers for shipment and use. Pressure means 30 is depicted in FIG. 1 as applying an optional pressure to packager 22, holding chamber 24, and cooler 26. Pressure means 30 may take the form of a pressure chamber which would encompass packager 22, holding chamber 24, and cooler 26.

Agitator 32 is also depicted in FIG. 1 and may be applied to the containers 23 found in holding chamber 24 and cooler 26 in order to enhance heat exchange therein. That is to say, agitation would aid in the maintaining of heat in holding chamber 24 while the same agitation applied by agitator 32 would aid in the removal of heat from containers found within cooler 26.

While in the preferred embodiment of the present invention the liquid egg and liquid egg product is unsalted, it is contemplated within the true scope and spirit of the invention that small amounts of salt may be added for flavoring purposes. Such small amounts have no preservative effect and are typically between about 0.1% and about 0.15% by volume.

More particularly, those skilled in the art will understand that higher percentage of salt at levels of 2% and above in whole eggs severely limit the use of the product for commercial purposes and acts as a preservative in the egg products.

In another embodiment of the invention, the product may be heated to a lower pasteurization temperature e.g. 140 degrees Fahrenheit, packaged in a non-aseptic container, sealed and further heated to a higher pasteurization temperature of say 145 degrees Fahrenheit, and then cooled. The heating time after the product is filled in the package must be less than the corresponding hold time for the fill temperature as indicated in Tables III and IV herein.

Although heating the product and container at pasteurization temperature is achieved in a relatively short period of time of between about 3.5 minutes and about 10 minutes, even shorter periods of heating may be achieved. In this regard, heating may take place through different methods such as microwave, electric pulse, radio frequency (RF), or ohmic heating, through heat exchangers, or any other suitable heating technique. Such other techniques may reduce the longer period from about 10 minutes to about 4 minutes, and the shorter period to about one-half of a minute.

Following pasteurization, the containerized product is rapidly cooled at a rate sufficient to refrigerate the egg product in the container in order to inhibit germination of bacterial spores therein. Agitation may be applied to the containers during the cooling of the prior heating steps in order to release or distribute heat evenly throughout the package and product. Such vibrational movement may be applied mechanically or through sonic methods. Moreover, the packaged egg product may then be shipped or stored while refrigerated. It has been found that the process of the present invention produces a liquid egg product with an extended shelf life without the restraints of aseptic packaging. Moreover, production throughput is significantly increased.

Figure 2:
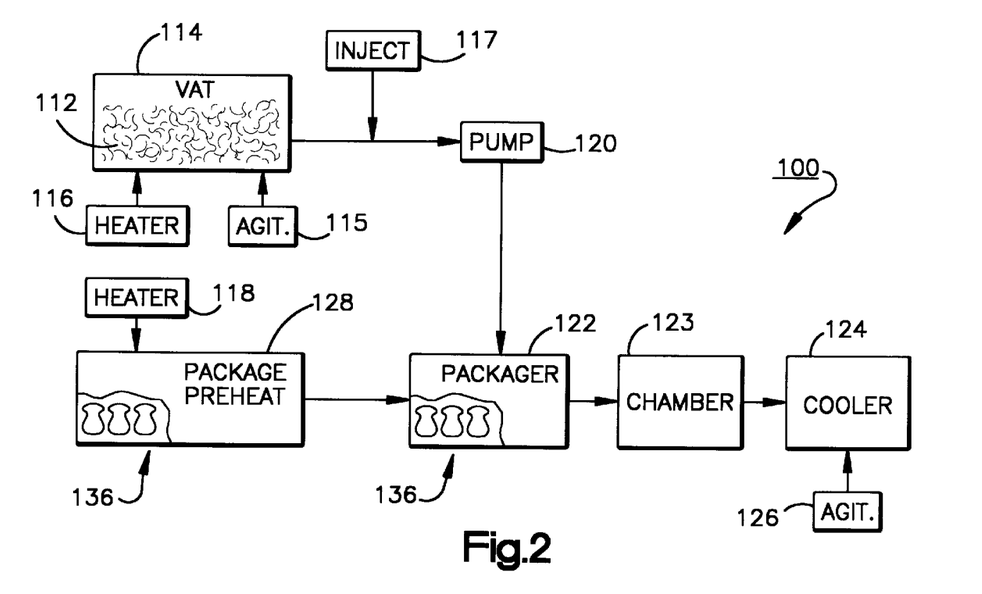
FIG. 2 is a block diagram showing an alternative method of the present invention.

Turning to FIG. 2, it may be observed that an alternate process 100 is described. Raw egg liquid product 112, such as egg yolks or egg whites or combinations thereof with other additives are provided in a vat 114. Again, a chemical injector 117 may be employed in the same manner as described in FIG. 1. While in the vat 114, the raw liquid egg product 112 is heated to a pasteurization temperature by a heater 116. The heated product 112 is held in the vat 114 at a constant temperature for less than 3.5 minutes and then is transferred to packager 122 via an non-aseptic pump 120 which fills a plurality of preheated non-aseptic containers 136. The containers 136 passed previously to a package heater 128 which is in the form of direct or indirect heating, radio waves, microwaves, emersion in hot fluid or air, and the like. The packager 122 is insulated for helping to maintain a constant temperature. The filled preheated containers 136 are then immediately sealed and passed via an insulted chamber 123 to a cooler 124 which rapidly removes heat from filled containers 136 to a refrigeration level temperature. The chamber 123 is well insulted. In this regard, heat is neither added nor removed from the containers 136 as they pass through the chamber 123. In short then, the chamber 123 helps hold the temperature of the containers 136 and the product contained therein at a substantially constant temperature.

It will be understood by those skilled in the art, that the containers 136 can pass through the chamber 123 in a very short period of time and thus, throughput production is greatly increased.

Again, agitators, such as an agitator 115 and agitator 126 may apply vibrational energy to the vat 114 and cooler 124 respectively, for the purposes of heat exchange.

The preheating of the containers 136 to a temperature of between about 131 degrees Fahrenheit to about 160 degrees Fahrenheit just prior to being filled with the preheated egg product 112, prevents the hot fill egg product from cooling to a temperature below a pasteurization temperature. In this regard, the combination of the hot fill egg product 112 and preheated containers 136 allows the complete pasteurization of both containers and egg product while traveling from the packager 122 to the cooler 124. Thus, there is no need for the application of additional heating once the hot egg product 112 has been sealed in an individual one of the containers 136.

From the foregoing, those skilled in the art should understand the primary benefit of this process allows different types and kinds of packaging, including packaging of different sizes and volumes. More specifically, package size has no effect on the time the filled container must be held at a pasteurization temperature. Instead, preheating both the package container and the egg product allows the pasteurization process to be completed in package in substantially the same period of time regardless of the package size. This is unique and novel greatly increasing production capacity which simultaneously increasing the refrigerated shelf life of the egg product to about 36 weeks.

In another embodiment of the invention, once the preheated liquid egg or liquid egg product is sealed in the non-aseptic container, the temperature of the product need not be further increased. In this embodiment, the product heating time in the package is zero, as the containerized product is allowed to cool slowly from 160 degrees Fahrenheit to about 140 degrees Fahrenheit anywhere between 30 minutes to 2 minutes. Heating may take place through different methods, such as microwave, radio frequency (RF), ohmic heating, or through heat exchangers, or any suitable heating technique.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

The following examples are further provided to illustrate the invention but are not deemed to limit the same in any manner.

EXAMPLE 1

Two boxes containing 15 dozen poultry eggs were purchased commercially. The boxes of eggs were kept in an unheated room at outside ambient temperature on Sep. 6, 1994, in Richmond, Calif. On the following day, 15 dozen of the eggs were broken from their shells and blended. The blended eggs were then transferred to a plastic jug and placed under refrigeration. The eggs at the time of blending possessed a B grade quality, i.e., the whites possessed visual firmness and air pocket size attributed to B grade eggs. Two days later 10 millimeters of raw commercial egg liquid, which was previously frozen on May 17, 1994, was added to the liquid egg product in the plastic jug to ensure contamination. Three liters of the liquid egg product were heated in a one gallon plastic jug which was placed in a hot water bath. After the liquid egg temperature reached 65° C., three one-liter plastic bottles were filled, sealed, and placed in hot water at 65 to 67° C. for 20 minutes. Following the 20 minute hold in the hot water bath, the three one-liter plastic bottles containing the liquid egg product were placed in a salt water and ice solution possessing a temperature of (−2)° C. and agitated. The cooling and agitation extended for 17 minutes at which time the bottles were removed, rinsed in tap water, and placed in a refrigerator.

EXAMPLE 2

Egg samples were prepared in one-litter plastic bottles in the same manner as the samples found in Example I, except that yolks and whites of the egg were kept in the same container without blending. Instead of bathing the samples in hot water, the samples of this example were heated in a microwave to 57° C. to 60° C. within 30 minutes, and then refrigerated.

EXAMPLE 3

A third sample was prepared on Sep. 15, 1994 by filling two two-liter bottles with the raw liquid egg material prepared in Example I. The raw liquid egg material of Example I was kept in a refrigerator between Sep. 9, 1994, and Sep. 15, 1994, thus the packaging of this third sample occurred approximately six days after the packaging of Example I. The bottles of this example were heated to a temperature of about 57° C. to 60° C. in a microwave, placed in a hot water bath between 57° C. and 60° C. for 30 minutes, and then refrigerated.

EXAMPLE 4

Liquid egg product prepared in Example I was kept in a refrigerator for one week and retrieved on Sep. 15, 1994. The liquid egg sample was placed into a two-liter bottle and mixed with 25 percent lowfat (2% fat) pasteurized milk. The bottle was heated in a microwave and held between 57° C. and 60° C. for 30 minutes and then cooled.

EXAMPLE 5

Hand broken eggs were placed into a plastic one-liter bottle directly without excessive agitation on Sep. 9, 1994. The bottle was heated in a microwave to attain a temperature of 57° C. to 60° C. and held at 57° C. to 60° C. for 30 minutes. It was observed that some cooking of the egg product in the cap area of the bottle occurred due to low agitation.

The five samples of Examples 1–5 were evaluated organoleptically after approximately 60 days from the preparation of the samples found in Examples 3 and 4. The plastic bottles were uncapped from each of the samples and small amounts of the contents were poured into glasses for evaluation. The bottles were then recapped and placed in a domestic freezer for further bacterial testing. Each of the samples of Examples 1, 3, and 4 were also tested upon preparation and then 10–11 weeks later for microbial content. Table 1 represents the results. Samples of Examples 1–3 showed excellent results. Sample 4 included a rather high bacteria count which is believed due to the condition of milk in the product. Sample 5 is believed to have been contaminated by excessive heating in the cap area of the plastic bottle which may have activated spore forming bacteria or a micro-leak in the topseal. The latter possibility may have allowed bacteria to enter the container during cooling, contaminating the product.

EXAMPLE 6

A sample of Example 2 was retrieved 14 weeks from preparation. The product appeared to be in excellent condition having good color, smell, and cooked taste. Cake height tests were performed according to methods found in an article by Ball et al., 1987 (functionality and microbial stability of . . . ) Journal of Food Science, 52 (5) p. 1212:1218.

TABLE I

| Ex. No. | | Age (weeks) | | | | |
|---|---|---|---|---|---|---|
| | | Raw (0 week) | 10 | 11 | 18–19 | 26–28 |
| I | Total Plate Count | 4000 | — | <10 | — | <10 |
| | Coliform Count | 9 | — | <3 | — | <3 |
| | Organoleptic | OK | — | OK | OK | OK |
| II | Total Plate Count | 4000 | — | <10 | — | <10 |
| | Coliform Count | 9 | — | <3 | — | <3 |
| | Organoleptic | OK | — | OK | OK | OK |
| III | Total Plate Count | 6.20E + 06 | <10 | — | — | <10 |
| | Coliform Count | 240 | <3 | — | — | <3 |
| | Organoleptic | OK | OK | — | — | OK |
| IV | Total Plate Count | 4.10E + 06 | 2.50E + 06 | — | — | — |
| | Coliform Count | 240 | <3 | — | — | — |
| | Organoleptic | OK | OK | — | — | — |
| V | Total Plate Count | — | — | 5.70E + 06 | — | — |
| | Coliform Count | — | — | <3 | — | — |
| | Organoleptic | — | — | OK | — | — |

The following results were found according to Table II below.

TABLE II

| | Reading (CM) | | | |
|---|---|---|---|---|
| Cake No.: | 1 | 2 | 3 | Average: |
| 1. Liquid Egg | 6.4 | 6.0 | 6.3 | 6.02 |
| 2. Liquid Egg | 5.9 | 5.8 | 5.7 | |
| 3. Shell Egg | 6.1 | 5.8 | 6.0 | 6.12 |
| 4. Shell Egg | 6.0 | 6.5 | 6.3 | |

Based on the foregoing, a preferred process for extending the shelf life of an liquid egg product for subsequent consumption includes the following steps:

(1) Preparing a given volume of the unsalted liquid egg product for subsequent consumption;

(2) Preheating the unsalted liquid egg product via the preheater 18 to a processing temperature of at least 55° C. for helping to reduce any microorganisms and spoilage bacteria contained within the product;

(3) Using non-aseptic packaging equipment such as the packager 22 and non-aseptic containers such as the container 23 for helping to reduce production costs;

(4) Without cooling the heated liquid egg product, packaging non-aseptically said given volume of the preheated unsalted liquid egg product in at least one substantially air tight non-aseptic container to help facilitate the storage of the unsalted liquid egg product;

(5) Transferring the non-aseptic container 23 to a heated holding chamber, such as the chamber 24;

(6) Maintaining the temperature within the holding chamber at a processing temperature of between about 60° C. and about 71° C. for a predetermined period of time no greater than between about 35 minutes and about 1 minutes to pasteurize the liquid egg product and to substantially reduce any remaining microorganisms and spoilage bacteria contained therewith;

(7) Transferring the container 23 to a cooling chamber, such as the cooling chamber 26;

(8) Cooling the egg products within the container rapidly to a non-freezing temperature of between about 5° C. to about 0° C. within another predetermined period of time of no greater than 120 minutes; and (9) Transferring the cooled egg product containers to a refrigeration packager for refrigeration the unsalted liquid egg product at a non-freezing temperature to help inhibit germination of bacteria for an extended shelf life period of substantially greater than three weeks.

While the preferred embodiment, the product-package combination may be held at pasteurization temperature according to the mathematical relationship defined in equation 1.

Equation I $$\text{Hold time} = -262.62 + 5.3410 \times \text{Hold Temp} - 0.022990 \times \text{Hold Temp}^2$$

Where Hold time is in minutes, and hold temperature is in degrees Fahrenheit.

Alternatively, Table III can be used to determine the maximum hold time at each hold temperature. The points between these temperature may be calculated by interpolation.

TABLE III

| Hold Temp (° F.) | Hold Time (min) | Hold Temp (° C.) | Hold time (sec) |
| --- | --- | --- | --- |
| 140 | 34.5 | 60.0 | 2071 |
| 141 | 33.4 | 60.6 | 2004 |
| 142 | 32.2 | 61.1 | 1934 |
| 143 | 31.0 | 61.7 | 1861 |
| 144 | 29.8 | 62.2 | 1786 |
| 145 | 28.5 | 62.8 | 1708 |
| 146 | 27.1 | 63.3 | 1627 |
| 147 | 25.7 | 63.9 | 1543 |
| 14g | 24.3 | 64.4 | 1457 |
| 149 | 22.8 | 65.0 | 1367 |
| 150 | 21.3 | 65.6 | 1275 |
| 151 | 19.7 | 66.1 | 1181 |
| 152 | 18.1 | 66.7 | 1083 |
| 153 | 16.4 | 67.2 | 983 |
| 154 | 14.7 | 67.8 | 880 |
| 155 | 12.9 | 68.3 | 774 |
| 156 | 11.1 | 68.9 | 665 |
| 157 | 9.2 | 69.4 | 554 |
| 158 | 7.3 | 70.0 | 440 |
| 159 | 5.4 | 70.6 | 323 |
| 160 | 3.4 | 71.1 | 204 |
| 161 | 1.4 | 71.7 | 81 |

After holding, the product may be cooled to below 40 degrees Fahrenheit, but above freezing (about 30 degrees Fahrenheit for whole egg product), in less than 120 minutes.

Liquid egg white products require a much gentler heat treatment to maintain their functionality. For such products, the following mathematical relation can be used.

Equation II $$\text{Hold time (minutes)} = 122.12 - 0.87500 \times \text{Hold Temp (°F.)}$$

Alternatively, Table IV can be utilized to determined the relationship.

TABLE IV

| Hold Temp (° F.) | Hold Time (min) | Hold Temp (° C.) | Hold Time (sec) |
| --- | --- | --- | --- |
| 131 | 7.5 | 55.0 | 450 |
| 132 | 6.6 | 55.6 | 397 |
| 133 | 5.7 | 56.1 | 345 |
| 134 | 4.9 | 56.7 | 292 |
| 135 | 4.0 | 57.2 | 240 |
| 136 | 3.1 | 57.8 | 187 |
| 137 | 2.2 | 58.3 | 135 |
| 138 | 1.4 | 58.9 | 82 |
| 139 | 0.5 | 59.4 | 30 |

I claim:

1. A hot fill process to increase production throughput in processing raw liquid egg products to increase their refrigerated shelf life to at least 36 weeks, comprising:

preheating the liquid egg product to a sufficient preheated temperature to facilitate product pasteurization, said sufficient preheated temperature being within a range of between about 71.1° C. and about 55° C.;

preheating a product container to a sufficient heat transfer temperature to significantly reduce holding temperature periods in a pasteurization process, said sufficient heat transfer temperature being within a range of between about 71.1° C. and about 55° C.;

packaging the preheated liquid egg product in the preheated product container while preventing the preheated liquid egg product from cooling to a temperature below the range of said sufficient preheated temperature;

holding the packaged liquid egg product at a constant pasteurization temperature of between about 71.1° C. and about 55° C. for a holding time period between about 30 seconds and about 2071 seconds; and removing rapidly a sufficient amount of thermal energy from the container and the liquid egg product in a cooling time period of between about 5 minutes and about 120 minutes to stabilize the package liquid egg product at a refrigeration temperature of between about 5° C. and −1° C. without freezing the liquid egg product.

2. A hot fill process according to claim 1, wherein said liquid egg product is an unsalted liquid egg product.

3. A hot fill process according to claim 1, wherein said liquid egg product includes a small quantity of salt between about 0.1% by volume and about 0.15% by volume.

4. A hot fill process according to claim 1, wherein said liquid egg product is an egg yolk product; and wherein said sufficient preheated temperature and said sufficient heat transfer temperature are each between about 71.1° C. and about 60° C.

5. A hot fill process according to claim 1, wherein said liquid egg product is an egg white product and wherein said sufficient preheated temperature and said sufficient heat transfer temperature are each between about 59.4° C. and about 55.0° C.

6. A hot fill process according to claim 4, wherein said liquid egg product is an egg yolk product; and wherein said holding time period is between about 81 seconds and about 2071 seconds.

7. A hot fill process according to claim 5, wherein said liquid egg product is an egg yolk product; and wherein said holding time period is between about 30 seconds and about 450 seconds.

8. A hot fill process according to claim 1, wherein a more preferred cooling time period is between about 10 minutes and about 60 minutes.

9. A hot fill process according to claim 8, wherein a most preferred cooling time period is about 45 minutes.

10. A hot fill process according to claim 1, wherein a more preferred refrigeration temperature is between about 5° C. and about 0° C.

11. A hot fill process for extending the refrigerated shelf life of a liquid egg product to about, comprising:
   preheating the liquid egg product at least to a pasteurization temperature of at least 55° C. to help reduce any microorganism and spoilage bacteria container therein;
   preheating a non-aseptic container to at least 55° C. to provide a heat transfer reservoir for completing the pasteurization of the liquid egg product;
   filling the preheated container with the preheated liquid egg product while preventing the preheated liquid egg product from cooling to a temperature below said pasteurization temperature;
   sealing the filled preheated container;
   holding the filled preheated container at a constant temperature of about 55° C. for 30 seconds to simultaneously complete pasteurization of the liquid egg product and the filled container further reducing any microorganism and spoilage bacteria container therein; and
   cooling the liquid egg product immediately following said step of holding to a refrigeration temperature of between about −1° C. and about 5° C. in a cooler time period of between about 10 minutes and about 60 minutes to extend the refrigeration shelf life of the liquid egg product to about 36 weeks.

12. A hot fill process according to claim 11, wherein said liquid egg product is an unsalted liquid egg product.

13. A hot fill process according to claim 11, wherein said liquid egg product includes a small quantity of salt between about 0.1% by volume and about 0.15% by volume.

14. A hot fill process according to claim 11, wherein a more preferred refrigeration temperature is between about 0° C. and about 5° C.

15. A hot fill process according to claim 14, wherein a more preferred cooling time period is between about 10 minutes and about 45 minutes.

16. A hot fill process for extending the shelf life of a liquid egg product comprising the steps of:
   preparing a given volume of the liquid egg product for subsequent consumption;
   preheating the liquid egg product above a pasteurization temperature to a processing temperature of at least 55° C. for helping to reduce any microorganisms and spoilage bacteria contained therein;
   without cooling the liquid egg product, pouring non-aseptically said given volume of the preheated liquid egg product at a filling temperature which is above said pasteurization temperature into at least one non-aseptic container to facilitate the storage of the liquid egg product in said container;
   permitting the filled non-aseptic container to stand at the filling temperature for at least one minute and no longer than about 35 minutes to facilitate pasteurization of the preheated liquid egg product in the container;
   transferring said container to cooling means to facilitate rapid cooling of the liquid egg product;
   cooling said container in said cooling means for a predetermined period of time of at least 5 minutes to rapidly cool the pasteurized liquid egg product to a non-freezing temperature; and
   refrigerating the container at said non-freezing temperature to help inhibit germination of bacteria in the pasteurized liquid egg product for a shelf life period of at least ten weeks.

17. A hot fill process according to claim 16, wherein said predetermined period of time period is between about 5 minutes and about 120 minutes.

18. A hot fill process according to claim 17, wherein a more preferred predetermined period of time is between about 30 minutes and about 60 minutes.

19. A hot fill process according to claim 18, wherein a most preferred time is about 45 minutes.

20. A hot fill process according to claim 16, wherein said non-freezing temperature is between about −1° C. and about 5° C.

21. A hot fill process according to claim 16, further comprising:
   agitating said liquid egg product during said step of preheating the liquid egg product.

22. A hot fill process according to claim 16, further comprising agitating said container during said step of maintaining the temperature of said container at about said processing temperature.

23. A hot fill process according to claim 16, further comprising:
   applying pressure to said container during said step of applying sufficient heat to said container.

24. A hot fill process according to claim 16, further comprising:
   adding a chemical sterilizer following said step of preparing.

25. A hot fill process according to claim 16 further comprising:
   adding a dairy product following said step of preparing.

26. A hot fill process according to claim 16 further comprising:
   adding a color additive following said step of preparing.

27. A hot fill process according to claim 16 further comprising:
   adding a particulate following said step of preparing.

28. A hot fill process according to claim 16 further comprising:
   adding a color preservative following said step of preparing.

29. A hot fill process according to claim 16 further comprising:
   adding a meat product following said step of preparing.

30. A hot fill process according to claim 16 further comprising:
   adding salt following said step of preparing.

31. A hot fill process according to claim 16 further comprising:
   adding a salt substitute following said step of preparing.

32. A hot fill process according to claim 16 further comprising:
   adding a vegetable product following said step of preparing.

33. A hot fill process for extending the shelf life of a liquid egg product comprising the steps of:

preparing a given volume of the liquid egg product for subsequent consumption;

preheating the liquid egg product to a processing temperature of at least 55° C. to initiate pasteurization for a first predetermined period of time which is insufficient to effect complete pasteurization;

without cooling the liquid egg product, pouring non-aseptically said given volume of the preheated liquid egg product at a filling temperature into at least one non-aseptic container;

maintaining the filled non-aseptic container at the filling temperature for a second predetermined period of time sufficient to complete the pasteurization of the liquid egg product;

transferring said container to cooling means to facilitate rapid cooling of the liquid egg product;

cooling said container in said cooling means for a third predetermined period of time to rapidly cool the pasteurized liquid egg product to a non-freezing temperature; and refrigerating the container at said non-freezing temperature to help inhibit germination of bacteria in the pasteurized liquid egg product.

* * * * *

UNITED STATES PATENT AND TRADEMARK OFFICE
CERTIFICATE OF CORRECTION

PATENT NO : 6,090,425
DATED : Jul. 18, 2000
INVENTOR(S) : Samimi

It is certified that error appears in the above-identified patent and that said Letters Patent are hereby corrected as shown below:

Abstract, line 20, "mintues" should be "minutes".
Column 11, line 49, "14g" should be "148".

Signed and Sealed this

Third Day of April, 2001

*Attest:*

NICHOLAS P. GODICI

*Attesting Officer*     *Acting Director of the United States Patent and Trademark Office*